May 28, 1963  D. L. AMSDEN  3,090,995
EXTRUDER FOR PLASTIC TUBING
Filed June 1, 1961
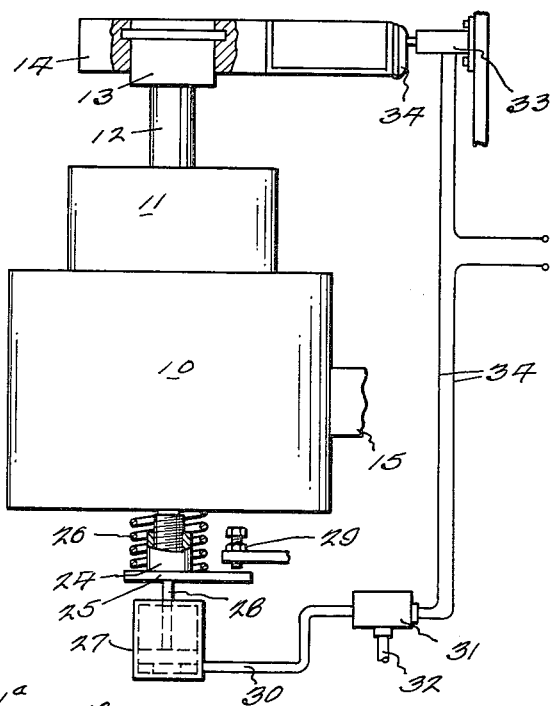
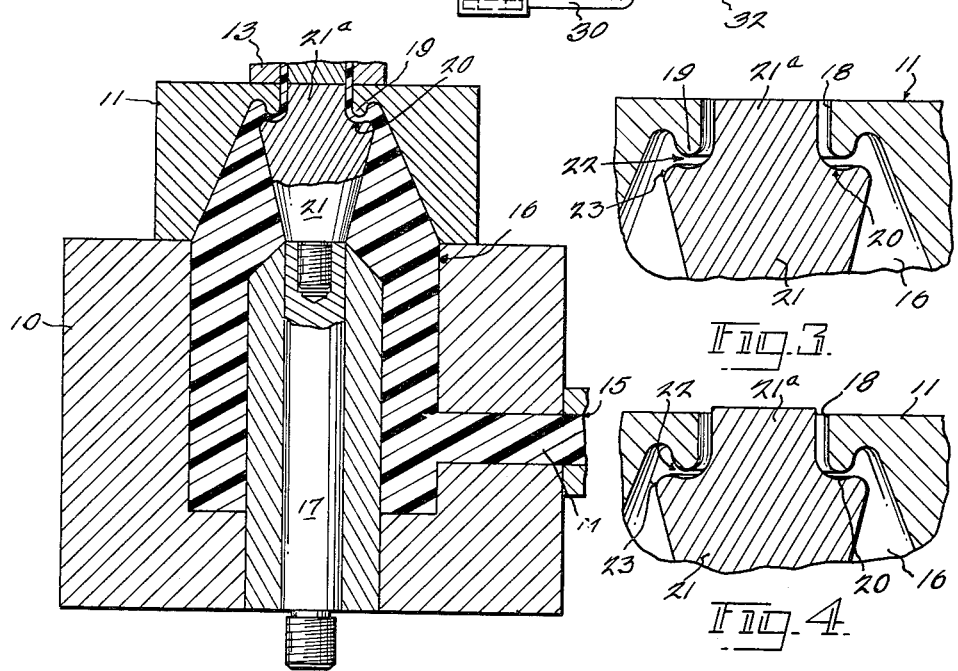
INVENTOR.
Donald L. Amsden
BY W. G. Schaich
and Spencer L. Blaylock Jr.
ATTORNEYS

United States Patent Office 3,090,995
Patented May 28, 1963

3,090,995
EXTRUDER FOR PLASTIC TUBING
Donald L. Amsden, Toledo, Ohio, assignor to Owens-Illinois Glass Company, a corporation of Ohio
Filed June 1, 1961, Ser. No. 114,054
4 Claims. (Cl. 18—14)

My invention relates to extruders for plastic tubing and more particularly is a simple, novel and effective means for varying and closely controlling the wall thickness of tubing which is being produced for fabrication into bottles and the like hollow blown containers.

In the fabrication of bottles from drawn, or extruded, thermoplastic material, polyethylene, for example, it has been observed that wherever the form or contour departs appreciably from a substantially straight-sided cylinder, there is a strong tendency toward excessive thinning and/or thickening of the walls. Thus, if the bottle diameter in the shoulder, for example, is materially greater than the extruded tube, the wall thickness diminishes and may well produce a dangerously weak shoulder. The reverse may be true where a part of the finished article is of smaller diameter than the extruded tube at the point of extrusion.

An important object of my invention is the provision of novel means for regulably controlling the wall thickness of extruded tubing in such fashion that the tubing, as extruded, will vary as to wall thickness in a manner insuring uniform distribution of the plastic material throughout the walls of the completed article.

Another object of my invention is the provision of a novel extruder and control means whereby, at predetermined time intervals during the extrusion of a given length of tubing, the extruder will be re-set to change the wall thickness in axially spaced apart annular zones, as required by the particular article being manufactured.

A further object of my invention is the provision of a thermoplastic tube extruder in which a mandrel or core positioned within an orifice bushing has an annular land shiftable axially relative to an opposed annular orifice flange or die wall to regulably control the wall thickness of extruded tubing.

Other objects will be in part apparent and in part pointed out hereinafter.

In the accompanying drawings forming a part of my application:

FIG. 1 is an elevational view, partly in section, of apparatus incorporating my invention.

FIG. 2 is a vertical central sectional view, partly in elevation, showing an extruder embodying my invention.

FIG. 3 is a fragmentary detail sectional view of my extruder invention showing the core or mandrel and orifice flange spaced apart to form a tube of substantial wall thickness.

FIG. 4 is a view similar to FIG. 3 with the core and orifice flange or die closer together to reduce the wall thickness of the extruded tube.

In the illustrated embodiment of my invention it is incorporated in apparatus including an orifice head 10 surmounted by an orifice bushing 11 from which a length of plastic tubing is extruded to provide a blank 12, such being blown to produce a bottle (not shown) or similar hollow container. Above the orifice bushing and coaxially with it is a neck mold 13 which may be of standard form and carried by a conventional vertically movable holder 14. Any suitable mechanism (not shown) may reciprocate the mold and its holder vertically, thereby bringing the neck mold first into contact with the orifice bushing and then moving it upwardly concurrently with extrusion of the tube to a position where it remains during expansion of the tube in a blow mold (not shown). While the neck mold 13 is in its lowermost position (FIG. 2) it is filled with a thermoplastic molding material by an injection process. Thereafter, as the neck mold rises, molding material is extruded in tubular form to produce a blank which later is expanded by air under pressure to form a finished bottle.

Delivery of the molding material M to the orifice bushing is effected by way of an inlet port 15 opening into an annular chamber 16 encircling a mandrel or core holder 17, the latter disposed coaxially with the orifice bushing 11 and being mounted for axial movement in the orifice head 10. The holder extends downwardly through the lower end of the orifice head 10 for attachment to actuating means, as will be explained presently.

Close control of the wall thickness of tubing extruded from the orifice bushing 11 and varying the thickness from zone to zone annularly of the tubing in predetermined fashion and as required by a specific container being produced, may well be effected in the following described manner.

The orifice bushing 11 has a circular opening or bore 18, the wall of which is straight-sided for a short distance inwardly to a point at which it merges with an annular rib or flange 19. This rib cooperates with an annular land 20 formed on the core or mandrel 21 in providing an annular generally radially disposed passage 22, the transverse width of which determines the wall thickness of tubing extruded therefrom. The core or mandrel is separably attached to its holder 17 and (FIG. 2) may well comprise a head of circular cross-section with an exterior surface slightly divergent toward the orifice bushing opening 18. This divergent surface merges with the outermost margin of the annular land 20, preferably through a radius 23. The land itself (FIGS. 2, 3 and 4) preferably is curved transversely to provide a relatively long irregular path of travel for the molding material. Thus it becomes well formed and set prior to actual extrusion and the inherent "elastic memory" of the plastic is therefore less effective in changing dimensions of the tubing, following extrusion. Periodic change in the axial spacing apart of the land 20 and rib or flange 19, during each cycle of operation, produces the desired variation in wall thickness of each length of extruded tubing.

An axially outward extension 21ª on the core or mandreal cooperates with the wall of the orifice bushing bore 18 in providing an annular passageway through which the tubing is extruded concurrently with movement of the neck mold away from said bushing. The exterior surface of this extension merges with the inner periphery of the land 20. Such change may be obtained by mechanism controlled by the vertical movement of the neck mold and its holder. Incidentally, whether the apparatus is positioned as illustrated herein, or inverted, so that the tubing is extruded downwardly, is immaterial. The bottom end of the mandrel holder 17 may be threaded into a sleeve 24 which has a radial flange 25 at its lower end. A coil expansion spring 26 confined between the flange and bottom of the orifice head 10 yieldingly holds the mandrel in its lower most position. A piston motor 27, the piston rod 28 of which is connected to said sleeve 24, functions both to limit the downward movement of the mandrel and to raise the latter, at intervals. An adjustable stop 29 (FIG. 1) regulably predetermines the uppermost position of the mandrel and therefore the minimum wall thickness of a length of extruded tubing.

Air under pressure is supplied to the piston motor through a pipe 30 leading to a solenoid valve 31 and thence to a main supply conduit 32. Operation of the solenoid valve is under the control of a cam actuated microswitch 33. Electric current conductors 34 interconnect the valve 31, microswitch 33 and a source of electric current (not shown). There may be more than one such microswitch, the number thereof being determined by the number of wall thickness changes required in each length of extruded tubing. As shown, the microswitch 33 occupies a fixed, though vertically adjustable position, so located with respect to the path of travel of the neck mold holder that a cam 34 carried by the latter actuates the microswitch 33 and holds the circuit closed a predetermined period of time. Thus the valve 31 is opened and the piston motor operated to thereby elevate the mandrel and reduce the width of the space between the land 20 and rib or flange 19. Such reduces the wall thickness of the extruded tubing. The axial extent of the zone of reduced wall thickness is directly determined by the length of the microswitch actuating cam 34.

It is, of course, understood that movement of the neck mold 13 axially away from the orifice bushing 11, after filling by injection, exerts a constant pull upon the tube as it is extruded. Thus the tubing is subjected to adequate tension to insure continuous upward or axial movement and support against collapse.

With apparatus as herein disclosed, tube wall thickness, at the orifice, may very accurately be regulated, so that expansion of the tubing by the introduction of air under pressure thereinto will result in the production of an article having walls of substantially uniform dimensions.

Modifications may be resorted to within the spirit and scope of the appended claims.

I claim:

1. In plastic tube extruding apparatus, an orifice bushing and mandrel positioned relatively to provide an annular axially elongated passageway into and through which plastic material may be extruded as a preformed tube, tube forming and wall thickness dimensioning means positioned axially inward from the passageway and including a generally radially outwardly extending annular land encircling and integral with the mandrel and an annular rib at the inner end of the passageway axially opposite and for cooperation with said land in creating an annular generally radial outlet orifice providing communication between said passageway and the interior of an orifice head for imparting final tubular form and wall thickness to material extruded from the head interior into said passageway and means for relatively axially moving the mandrel and rib to vary the spacing of the land and rib to correspondingly vary the wall thickness of an extruded length of tube in axially spaced-apart zones, said relative axial movement occurring during each operating cycle.

2. In apparatus as defined in claim 1, said annular land being curved in a radial direction to provide an annular channel and the annular rib being approximately opposite the channel.

3. Apparatus as defined in claim 1 and means joined to the tube adjacent the orifice bushing and movable axially away from the latter to place the tube under axial tension during its formative stages.

4. Plastic tube forming apparatus comprising an orifice bushing and mandrel positioned relatively to provide an annular axially elongated passageway which plastic material is to enter as a preformed tube of predetermined wall thickness, tube forming and wall thickness dimensioning means axially inward from said passageway including axially spaced-apart generally radially disposed discharge orifice forming surfaces wherein the orifice provides both communication between said passageway and a source of supply of plastic material and constitutes the sole wall thickness control means.

References Cited in the file of this patent

UNITED STATES PATENTS

| | | |
|---|---|---|
| 2,626,427 | Brown | Jan. 27, 1953 |
| 2,632,202 | Haines | Mar. 24, 1953 |
| 2,750,625 | Colombo | June 19, 1956 |
| 2,780,835 | Sherman | Feb. 12, 1957 |
| 2,871,516 | Sherman et al. | Feb. 3, 1959 |
| 2,890,483 | Soubier | June 16, 1959 |
| 3,019,481 | Negoro | Feb. 6, 1962 |